United States Patent

Huber et al.

[11] Patent Number: 5,916,666
[45] Date of Patent: Jun. 29, 1999

[54] DECORATIVE SHEET AND METHOD OF MAKING THE SAME

[75] Inventors: Charles Lee Huber, Dayton; John Robert Scancella, West Carrollton; Rick Wayne Narramore, Springboro, all of Ohio

[73] Assignee: The West Carrollton Parchment Company, West Carrollton, Ohio

[21] Appl. No.: 08/694,856

[22] Filed: Aug. 9, 1996

[51] Int. Cl.⁶ .................. B32B 3/00; B32B 29/00
[52] U.S. Cl. .............. 428/195; 428/201; 428/340; 428/537.5
[58] Field of Search ............... 428/537.5, 151, 428/507, 508, 511, 340, 342, 153, 195, 201, 207

[56] References Cited

U.S. PATENT DOCUMENTS

| | | | |
|---|---|---|---|
| 3,519,456 | 7/1970 | Reed et al. | 117/3.1 |
| 4,058,648 | 11/1977 | Louden | 428/511 |
| 4,421,808 | 12/1983 | Winkowski | 428/55 |
| 4,482,598 | 11/1984 | Ishii et al. | 428/195 |
| 4,552,792 | 11/1985 | Julian et al. | 428/40 |
| 5,601,930 | 2/1997 | Mehta et al. | 428/535 |

*Primary Examiner*—Paul Thibodeau
*Assistant Examiner*—Holly C Rickman
*Attorney, Agent, or Firm*—Killworth, Gottman, Hagan & Schaeff L.L.P.

[57] ABSTRACT

The present invention is directed to a decorative sheet useful as an exterior ply in a pressed wood decorative laminate and the method of making such a sheet. The decorative sheet comprises a sheet formed from a genuine vegetable parchment paper having a Sheffield smoothness of about 40 to about 200; a film former, which increases the printability of the paper, on the paper; and an overcoat layer. The sheet may also have a pattern printed thereon. The method includes the steps of providing a genuine vegetable parchment paper, the genuine vegetable parchment paper being coated with a film former; supercalendering the paper; and applying an overcoat layer to the paper. The method may also include the additional step of applying a pattern to the sheet. Typically, the pattern will be a wood grain pattern. The invention also includes a laminate formed by applying the decorative sheet to a substrate.

6 Claims, 2 Drawing Sheets

DECORATIVE SHEET AND METHOD OF MAKING THE SAME

BACKGROUND OF THE INVENTION

The present invention relates to a decorative sheet used to make a decorative laminate and, more particularly, to a decorative sheet which is formed from a genuine vegetable parchment paper and which, when printed, provides a wood grain appearance to pressed wood articles when laminated to those articles. The present invention also relates to a method for making such a sheet.

Many household articles are made from pressed wood products. These products are formed by compressing wood particles and sawdust to form boards which are then used to manufacture articles such as furniture, counter tops, wall board, picture frames, cabinets and other similar articles. Because these products are not made from a single piece of wood, they do not have a wood grain appearance when they are formed. To provide these articles with a wood grain appearance, a printed, decorative sheet or foil is usually laminated to the board. The sheet usually carries a pattern, which simulates a wood grain pattern, to provide the pressed wood with the appearance of a real wood. These sheets are particularly useful because they can be used to simulate a variety of wood grain patterns thus reducing the need to use a variety of actual wood products and conserving wood.

When certain conventional decorative sheets become wet, liquid penetrates the sheet and comes into contact with the board to which the sheet has been applied. When liquid comes in contact with pressed board, the board swells and warps. Further, the sheet can ripple which destroys the illusion of the wood grain appearance and usually ruins the article. Although conventional foils and papers do provide a water barrier, they do not prevent the penetration of water which contacts the board for periods of time longer than a couple of hours. Thus, water remaining on the sheet for more than 3 to 4 hours may damage both the sheet and the underlying board.

Additionally, papers and foils currently used in the art to make decorative laminates have a tendency to curl once the wood grain pattern has been applied to the sheet. This curl makes it difficult to apply these papers and foils to the pressed wood to make an attractive laminate.

For these reasons, a need exists for a useful paper which can be used to create decorative sheets useful for making decorative laminates which, in turn, are made into household and office articles. A further need exists for a decorative sheet having an improved wet strength.

SUMMARY OF THE INVENTION

The present invention is directed to a decorative sheet, which can be used to form a decorative laminate, and a method for manufacturing such a decorative sheet. This decorative sheet has an improved wet strength and reduced curl in comparison to other sheets and foils currently being used in the art because a genuine vegetable parchment paper is used. Although parchment paper has been used for interior surfaces of household and office articles, it has not been previously used as an exterior, decorative surface for such an article because the rough texture of the parchment paper was not sufficiently printable to allow a wood grain pattern to be applied to the paper. It has now been discovered that, by supercalendering the parchment paper, the paper can be provided with a smoothness which allows printing of intricate wood grain patterns onto the paper. This, in turn, provides a decorative sheet with an improved appearance which is useful for making decorative laminates.

One aspect of the invention concerns the decorative sheet itself. The decorative sheet comprises a first layer formed from a genuine vegetable parchment paper having a Sheffield smoothness of about 40 to about 200. The increased smoothness of this paper increases its printability and allows the paper to be printed by methods currently in use in the art. The paper includes a film former which reduces the curl in the paper and also increases the printability of the paper. The paper also includes an overcoat varnish which protects the paper and enhances its appearance. The sheet may also include a pattern on the surface of the genuine vegetable parchment paper. The pattern may be either printed onto the surface of the parchment paper by a separate printing process or applied to the parchment paper as the overcoat layer is being applied. Preferably, the pattern simulates the appearance of a wood grain.

The present invention also concerns a method for making a decorative sheet. The method comprises the steps of providing a genuine vegetable parchment paper which has been coated with a film former; passing the coated paper through a supercalender; and applying an overcoat layer to the paper. The method may also include the step of printing a pattern onto the paper prior to application of the overcoat layer. In a preferred embodiment, the step of providing a genuine vegetable parchment includes the following steps: providing a roll of waterleaf paper; subjecting the paper to an acid bath to change the waterleaf paper to genuine vegetable parchment paper; washing the parchment paper to reduce its acidity; drying the parchment paper; coating the parchment paper with a film former; and drying the film former. The method may also include the step of applying an adhesive to the decorative sheet.

Another embodiment of the invention comprises a laminate formed by laminating the decorative sheet described above to a substrate. Useful substrates include real wood, pressed or formed wood, plastic and metal.

Other objects and advantages of this invention will be apparent from the following description, the accompanying drawing and the appended claims.

DETAILED DESCRIPTION OF THE INVENTION

It has been discovered that genuine vegetable parchment paper can be used as a decorative sheet and its effectiveness as a decorative sheet can be increased by passing the paper through a supercalender. Supercalendering increases the smoothness of the paper which increases its printability. Additionally, genuine vegetable parchment paper has an improved water resistance when compared to papers currently being used in the art to make decorative sheets.

Figure 1:
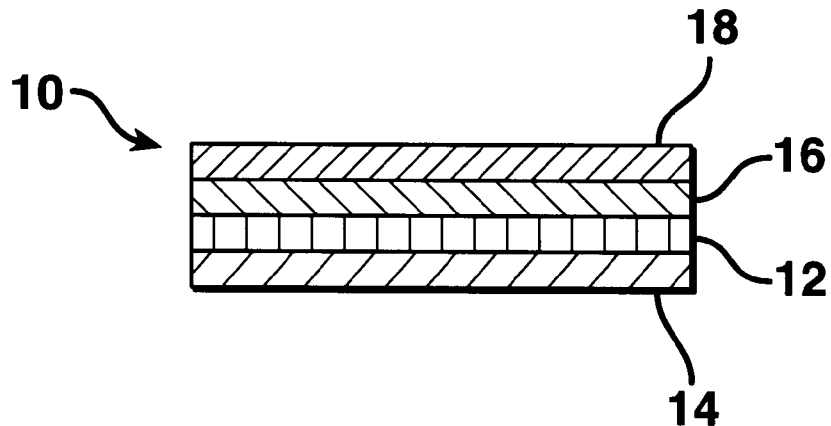
FIG. 1 presents a cross sectional view of the decorative sheet of this invention.

FIG. 1 presents a cross sectional view of one embodiment of the decorative sheet of this invention. The decorative sheet 10 comprises a parchment sheet 12, a film former 14, a pattern 16 and an overcoat layer 18. Parchment sheet 12 is supercalendered to provide it with an increased smoothness so that it can be printed with pattern 16. As will be described below, film former 14 is coated onto parchment sheet 12 prior to the application of pattern 16 or overcoat layer 18. Film former 14 may be applied to either side of sheet 12 or to both sides. Once film former 14 has been applied to parchment sheet 12, pattern 16 may then be applied to parchment sheet 12. Pattern 16 may be any desired pattern including solid colors, but is preferably a pattern which simulates a wood grain pattern. Once pattern 16 has been applied to parchment sheet 12, overcoat layer 18 is applied to parchment sheet 12 to protect parchment sheet 12 and improve its appearance. In an alternate and equally effective embodiment, overcoat layer 18 is applied to sheet 12 bearing a pattern such that a separate pattern, such as pattern 16, is unnecessary. This pattern may also be any desired pattern including solid colors, but is preferably a pattern which simulates a wood grain pattern.

Parchment sheet 12 can have a basis weight of about 18 pound to about 65 pound per 3000 square foot ream. As hereafter disclosed all references to basis weights are based upon a 3000 square foot ream. In a preferred embodiment, parchment sheet 12 will have a basis weight of about 18 pound to about 40 pound and in a more preferred embodiment will have a basis weight of about 18 pound to about 30 pound. Parchment sheet 12 will have a pH of about 4 to about 6.5. Additionally, parchment sheet 12 will have a Sheffield smoothness, as measured on a Sheffield smoothness tester, of about 40 to about 200. In a preferred embodiment, the smoothness will be about 60 to about 130 and in a most preferred embodiment the smoothness will be about 60 to about 90. Finally, parchment sheet 12 will also be virtually free of pin holes. However, one skilled in the art will realize that the number of pin holes in a sheet depends upon the basis weight of the sheet and that most sheets are not completely free of pin holes.

Film former 14 is provided to create a film on parchment sheet 12 to prevent sheet 12 from curling and increase the printability of the parchment sheet 12. Film former 14 can be applied to either side of parchment sheet 12 or to both sides of parchment sheet 12. Preferably, film former 14 is applied to the side of parchment sheet 12 opposite to which overcoat layer 18 is applied. Film former 14 can be any coating which is applied to genuine vegetable parchment papers to prevent them from curling once overcoat layer 18 has been applied. Film former 14 is preferably selected from the group consisting of polyvinyl alcohol, carboxymethyl cellulose and mixtures thereof. The amount of film former 14 applied to parchment sheet 12 is typically equivalent to the weight of the ink used to form pattern 16 or the coat weight of overcoat layer 18 which will be applied after the application of film former 14. Typically, the amount of film former 14 added to sheet 12 will be about 0.25 to 0.50 lbs./ream of 3000 sq. ft. Film former 14 improves the density of sheet 12 and lends stability to decorative sheet 10.

Parchment sheet 12 has an improved wet strength when compared to other papers and foils currently in use in the art. Parchment sheet 12, and consequently decorative sheet 10, will have a minimum wet mullen of 6 and a maximum wet mullen of 20. This increased wet strength inhibits water from penetrating sheet 10 and damaging the underlying wood or material to which the sheet 10 is attached. When made according to the process of this invention, sheet 10 will prevent the penetration of water through to the underlying board for a minimum of 12 to 24 hours. Thus, water on the surface of sheet 10 would most likely evaporate before it could penetrate sheet 10 and cause damage to the underlying board.

Figure 2:
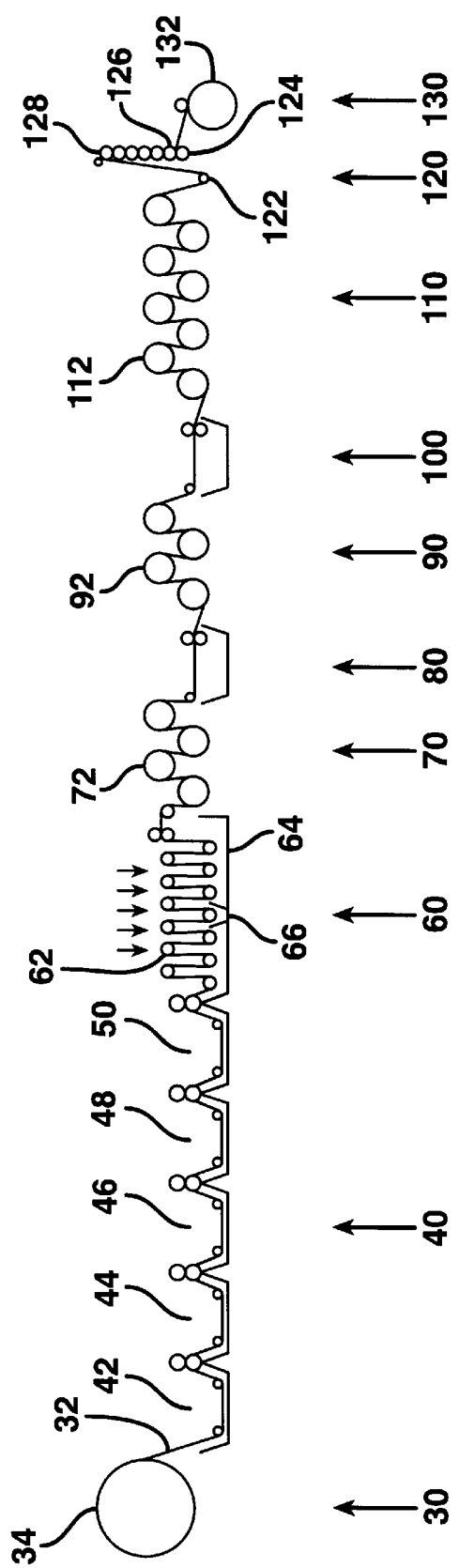
FIG. 2 presents a depiction of the method of manufacturing the genuine parchment paper.

FIG. 2 presents a diagrammatical illustration of the process of manufacturing the genuine vegetable parchment sheet 12. The process includes an unwinding station 30, acid boxes 40, wash station 60, first drying station 70, first coating station 80, second drying station 90, second coating station 100, third drying station 110, supercalender 120 and rewind station 130. Web 32 is unwound at unwinding station 30 and passed through a series of acid boxes 40 to parchmentize web 32. Web 32 is then neutralized in a wash station 60 and dried at first drying station 70. After web 32 is dried, it is coated at coating station 80 with film former 14 and dried at second drying station 90. Web 32 may then be coated a second time with film former 14 at second coating station 100. Web 32 is then dried at third drying station 110. Web 32 is then passed through a supercalender 120 after which web 32 is taken up on a roller at rewind station 130.

To start the process of making parchment sheet 12, web 32, which comprises a waterleaf paper, is unwound from a roll 34. Waterleaf paper is formed from a blend of hardwood and softwood fiber. Preferably, the waterleaf paper is 100% virgin pulp fiber but recycled pulp fiber or a mixture of recycled and virgin pulp fiber may also be used. Web 32 is first subjected to a series of acid boxes 40 to change the waterleaf paper into a genuine vegetable parchment paper. The first acid box 42 contains an acid having a Baumeof about 54°. The second box 44 contains a weak acid having a Baumeof about 30° to about 36°. The third box 46 contains a weak acid having a Baumeof about 15° to about 20°. The fourth box 48 contains a weak acid having a Baumeof about 8° to about 12°. Finally, web 32 is passed through a fifth box 50 containing an acid having a Baumeof about 1° to about 3°. The acid used in acid boxes 40 to parchmentize the waterleaf paper is preferably sulfuric acid.

Once web 32 has been transformed into a parchment paper in acid boxes 40, it is washed in wash station 60 to increase the pH of the paper. Wash station 60 comprises a series of rollers 62 over which web 32 passes as it is sprayed with water. As web 32 passes over rollers 62, it is also passed through a trough 64 filled with water. One of the rollers 62 passes web 32 through a part 66 of trough 64 containing a soda ash wash to further increase the pH of the paper. Wash station 60 increases the pH of the parchment paper to about 4 to about 6.5. Once the pH of the parchment paper has been increased, web 32 passes through drying station 70. Drying station 70 comprises a series of dryer cans 72 which heat the parchment paper to approximately 212° F. to dry web 32.

After web 32 has been dried, it is then moved through coating station 80 at which film former 14 is applied to sheet 12. As shown in FIG. 2, film former 14 is preferably applied to the back side of web 32. However, as stated above, film former 14 can be applied to either side of sheet 12 or to both sides of sheet 12. If film former 14 is applied to the top side of web 32, it is typically applied by means of a spray coating apparatus. One skilled in the art will understand that sheet 12 can be single or double coated depending on the number of coating stations employed in the process of manufacturing the sheet 12.

After being coated, web 32 is then passed through a second drying station 90 over a second series of drying cans 92 at which film former 14 is dried. Web 32 then passes through a second, optional, coating station 100 at which additional film former 14 may be applied to web 32. After being coated a second time, if desired, web 32 passes through a third series of drying cans 112 at third drying station 110.

Once the coating has been dried, web 32 is passed through a supercalender 120 to increase the smoothness of the parchment paper. Supercalender 120 comprises a spring roll 122, a king roll 124, a queen roll 126 and a series of additional rolls 128. King roll 124 has a diameter of about 18 inches, queen roll 126 has a diameter of about 15 inches and the remaining rolls 128 have diameters of about 12 inches. One skilled in the art will understand that the number and size of the rolls in supercalender 120 can vary as long as the required smoothness parameters for the paper are met. Supercalender 120 provides the paper with a Sheffield smoothness of about 40 to about 200. In a preferred embodiment, the Sheffield smoothness will be about 60 to about 130 and in a most preferred embodiment the Sheffield smoothness will be about 60 to about 90. It is this smoothness that allows the paper to be printed with a pattern and to retain the pattern. Once paper web 32 has passed through supercalender 120, it is wound onto roll 132 at rewind station 130. The completed genuine vegetable parchment paper will have a basis weight of about 18 pound to about 60 pound. The preferred and more preferred basis weights are as described above.

To effectively parchmentize the waterleaf paper and supercalender the parchment paper, the line speed of the process of making the supercalendered parchment paper is approximately 200 to 350 feet per minute. This speed accommodates both the time needed to expose the waterleaf to acid boxes 40 (at least 7 seconds) and to supercalender the parchment without damaging the parchment. The parchment is supercalendered at a pressure of between about 1500 p.s.i. and about 3000 p.s.i. and preferably at a pressure of between about 2000 p.s.i. and 2500 p.s.i. The surface temperature for each of the supercalender rolls can range from about 150° F. to about 250° F. and is preferably about 200° F.

After the parchment paper is rolled onto roll 132, pattern 16 may be applied to sheet 12. Pattern 16 can be applied by either rotogravure, flexographic or offset printing. Preferably, pattern 16 is applied by rotogravure printing. The paper can be printed with any desired pattern using conventional solvent or water based ink. If sheet 10 is to be used to simulate a wood grain pattern on an article, then it would, of course, be printed with a wood grain pattern. However, the pattern may also be solid color or any of an infinite variety of designs. For example, if sheet 10 were to be printed in a solid color it could be used for a counter top, backing paper, and bottoms of table tops.

After pattern 16 has been applied to sheet 12, an overcoat layer 18 is applied to sheet 12 in a conventional manner, such as by rotogravure printing, flexographic printing or offset printing, to protect the sheet 12 by providing increased water and scratch resistance and enhance its appearance by increasing the glossiness of sheet 10. Preferably, overcoat layer 18 is printed by means of a rotogravure process. Overcoat layer 18 is typically applied to the sheet 12 at a station separate from that at which the parchmentizing process takes place. Overcoat layer 18 may also be tinted and/or applied in a pattern such as a wood grain pattern. Suitable overcoats include lacquers, shellacs, melamine resins, plastics and acrylic resins.

In an alternate and equally effective embodiment, sheet 10 may not include pattern 16. Waterleaf sheets which have been dyed various colors can be utilized to produce articles which contain only overcoat 18 and not pattern 16. If pattern 16 is not applied to sheet 12, then overcoat layer 18 is applied to parchment sheet 12 in a manner such that it provides sheet 10 with a pattern. As stated above, overcoat layer 18 can be applied by means of rotogravure, flexographic or offset printing methods with rotogravure being preferred. Through these printing methods, overcoat layer 18 can be applied to sheet 12 so that it bears a pattern including a pattern such as a wood grain pattern. If it is desired to provide sheet 10 with a solid color appearance, then a tinted overcoat layer can be applied to sheet 12. In this embodiment, overcoat layer 18 can be formed from the suitable overcoats described above.

Either embodiment of decorative sheet 10 may also be coated on one side with an adhesive to facilitate its application to an article. Useful adhesives include hot melt adhesives, melamine adhesives and water based adhesives. The adhesives can be applied directly to sheet 10 and covered with a contact sheet for later use of sheet 10 or the adhesive can be applied to sheet 10 as sheet 10 is being adhered to an article. One skilled in the art will understand that the adhesive layer is applied to sheet 10 on its side opposite that on which the pattern is applied.

Decorative sheet 10 can be used to make household and office articles such as furniture, picture frames, cabinets, edge banding, wall board, counter tops and other similar articles. Sheet 10 is particularly useful to make counter tops because of its increased wet strength which makes the finished product highly resistant to water damage. The sheet is attached to the exterior or face side of the board in any manner commonly used in the art. It has been found that multiple opening presses and continuous presses are particularly useful. Sheet 10 may be applied to the board either before or after it is made into a household or office article. Sheet 10 may also be sold separately, e.g. on a roll or as separate sheets, for aftermarket uses.

Figure 3:
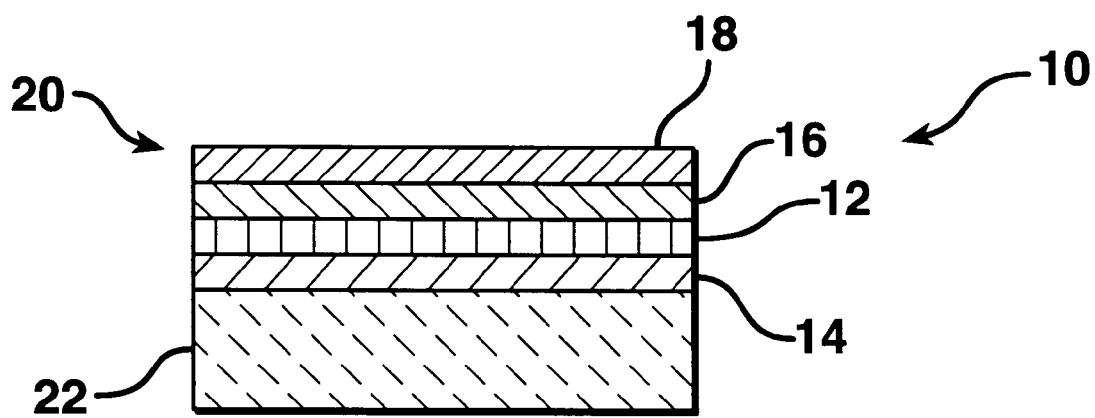
FIG. 3 presents a cross sectional view of a decorative laminate incorporating the decorative sheet of this invention.

FIG. 3 presents a cross sectional view of a decorative laminate incorporating decorative sheet 10 of this invention. The decorative laminate 20 comprises decorative sheet 10, as described above, and a substrate 22. As described above, decorative sheet comprises a parchment sheet 12, a film former 14, an optional pattern 16 and an overcoat layer 18. Decorative sheet 10 is laminated to substrate 22 in any conventional manner, such as those described above, to form decorative laminate 20. Substrate 22 is selected from the group consisting of natural wood, pressed or formed wood, plastic and metal. Preferably, substrate 22 is a pressed or formed wood. One skilled in the art will appreciate that although the decorative sheet has been described herein as being useful on wood products, wood particle products or pressed or formed wood products, it is also useful to provide a wood grain appearance to plastics and metals.

One skilled in the art will also appreciate that the invention is not limited to the precise method and apparatus described herein, and that changes can be made to this method and apparatus without departing from the scope of the invention, which is defined in the appended claims.

What is claimed is:

1. A decorative laminate comprising:

a substrate; and a decorative sheet laminated to said substrate, said decorative sheet including:
  a vegetable parchment paper having a Sheffield smoothness of about 40 to about 200;
  a printed ink pattern formed and retained on one side of said paper, and
  an overcoat layer over said printed ink pattern which provides increased water and scratch resistence and enhanced appearance to said decorative sheet.

2. The decorative laminate of claim 1 wherein the Sheffield smoothness of the paper is between about 60 and about 130.

3. The decorative laminate of claim 2 wherein the Sheffield smoothness of the paper is between about 60 and about 90.

4. The decorative laminate of claim 1 further including a film former on at least one side of said paper, and wherein said printed ink pattern is printed on a side of the paper opposite the film former.

5. The decorative laminate of claim 1 wherein the paper has a basis weight of about 18 pound to about 30 pound per 3000 square foot ream.

6. The decorative laminate of claim 1 wherein the substrate is selected from the group consisting of natural wood, pressed or formed wood, plastic and metal.

* * * * *